United States Patent Office 3,297,711
Patented Jan. 10, 1967

3,297,711
WATER-SOLUBLE PHTHALOCYANINE DYE-
STUFFS AND PROCESS FOR PREPARING
THEM
Hermann Remy, West Warwick, R.I., assignor to Farbwerke Hoechst Aktiengesellschaft vormals Meister Lucius & Bruning, Frankfurt am Main, Germany, a corporation of Germany
No Drawing. Filed Apr. 17, 1964, Ser. No. 360,780
Claims priority, application Germany, Apr. 27, 1963,
F 39,602
3 Claims. (Cl. 260—314.5)

The present invention provides valuable water-soluble phthalocyanine dyestuffs and a process for preparing them; more particularly, the invention provides metal-containing tetraphenyl phthalocyanine dyestuffs of the general formula

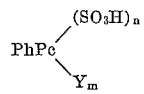

in which PhPc represents a metal-containing tetraphenyl phthalocyanine nucleus, Y represents the group $$-SO_2-CH_2-CH_2-OSO_3H$$

or the group $-SO_2-CH=CH_2$, $m$ and $n$ each represent a number from 1 to 7, the sum of $n$ and $m$ being at most 8.

This invention is based on the observation that valuable water-soluble metal-containing tetraphenyl phthalocyanine dyestuffs of the general formula

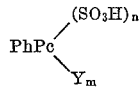

in which PhPc represents a metal-containing tetraphenyl phthalocyanine nucleus, Y represents the group $$-SO_2-CH_2-CH_2-OSO_3H$$

or the group $-SO_2-CH=CH_2$, $m$ and $n$ each represent a number from 1 to 7, the sum of $n$ and $m$ being at most 8, can be obtained by reducing a sulfo-chloride of the metal-containing tetraphenyl phthalocyanine to the corresponding sulfinic acid, reacting the latter with ethylene oxide, esterifying the resulting β-hydroxyethylsulfone compound with sulfuric acid and, if desired, treating the acid sulfuric acid ester thus obtained with an alkali.

When applied according to the usual processes for reactive dyestuffs the new dyestuffs yield on natural or regenerated cellulose fibers, in the presence of agents having an alkaline reaction, green dyeings and printings of high tinctorial strength possessing good properties of wet fastness and a good fastness to light.

The following examples serve to illustrate the invention but they are not intended to limit it thereto, the parts being by weight unless otherwise stated, and the relationship of parts by weight to parts by volume being the same as that of the kilogram to the liter.

Example 1

167 parts of tetraphenyl copper-phthalocyanine octasulfochloride (obtainable in analogous manner to copper-phthalocyanine tetrasulfochloride, as described in U.S. Patent No. 2,219,330) are introduced in the form of an aqueous paste into a solution of 101 parts of sodium sulfite in 600 parts by volume of water. In order to adjust and maintain the pH-value of the reaction which commences after a short time (pH-value of 5 to 10), about 180 parts by volume of a 25% sodium hydroxide solution are added gradually, the temperature not exceeding 40° C.

Subsequently, a stream of 100 parts of ethylene oxide is introduced at 55–80° C., preferably at 70–75° C., into the slightly turbid solution thus obtained, the pH-value being maintained at 7.5–10.0 by adding about 45 parts by volume of 93% sulfuric acid below the surface of the liquid. When the pH-value is constant the solution is stirred for several hours and the precipitation of the reaction product completed by acidification with hydrochloric acid (pH-value of 3.0). After cooling, the product is filtered with suction, washed with water and dried.

The dry reaction product thus obtained is introduced, in the form of a finely ground powder, into 96% sulfuric acid and the whole is stirred for several hours. The solution is then mixed with ice water, adjusted with a 25% sodium hydroxide solution or with sodium carbonate to a pH-value of 5.0 and the product salted out with potassium chloride. The dyestuff obtained is filtered with suction, washed with a 10% potassium chloride solution and dried. It dyes cotton in the presence of agents having an alkaline reaction green shades having good properties of wet fastness and a good fastness to light.

Example 2

60 parts of the dyestuff described in Example 1 are introduced while stirring into 1000 parts by volume of water and the temperature of the solution is raised to 70–80° C. The pH-value of the solution is adjusted to 9–10 with a 25% sodium hydroxide solution and kept constant by adding more sodium hydroxide solution. After about 1 hour the solution is cooled to 30° C., the volume of the reaction mixture is doubled by adding water and the pH-value reduced to 1.5. The dyestuff precipitated is filtered with suction and dried. It dyes cotton in the presence of agents having an alkaline reaction the same shades as the dyestuff described in Example 1, having the same good fastness properties.

I claim:
1. Water-soluble phthalocyanine-dyestuffs of the formula

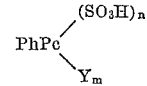

wherein PhPc is a metal tetraphenyl phthalocyanine, Y represents a member selected from the group consisting of $-SO_2-CH_2-CH_2-OSO_3H$ and $-SO_2-CH=CH_2$, $m$ represents a number of 1 to 7 and $n$ likewise a number of 1 to 7, the sum of $m$ and $n$ being at most 8.

2. The water-soluble tetraphenyl phthalocyanine-dyestuff of the formula

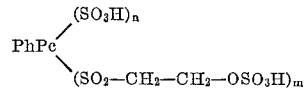

wherein PhPc is a tetraphenyl copper phthalocyanine, $m$ represents a number of 1 to 7 and $n$ likewise a number of 1 to 7, the sum of $m$ and $n$ being 8.

3. The water-soluble tetraphenyl phthalocyanine-dyestuff of the formula

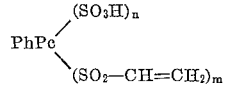

wherein PhPc is a tetraphenyl copper phthalocyanine, $m$ represents a number of 1 to 7 and $n$ likewise a number of 1 to 7, the sum of $m$ and $n$ being 8.

References Cited by the Examiner
UNITED STATES PATENTS 2,657,205   12/1950   Heyna et al. _____ 260—314.5

WALTER A. MODANCE, *Primary Examiner.*
JAMES A. PATTEN, *Assistant Examiner.*